United States Patent
Barth

(10) Patent No.: US 9,859,826 B2
(45) Date of Patent: Jan. 2, 2018

(54) INTELLIGENT DETECTION UNIT (IDU) TO DETECT THE POSITION OF A ROTOR CONTROLLED BY PULSE MODULATION

(71) Applicant: Infineon Technologies AG, Neubiberg (DE)

(72) Inventor: Martin Barth, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 30 days.

(21) Appl. No.: 15/014,815

(22) Filed: Feb. 3, 2016

(65) Prior Publication Data
US 2017/0222585 A1    Aug. 3, 2017

(51) Int. Cl.
H02P 6/06 (2006.01)
H02P 6/18 (2016.01)

(52) U.S. Cl.
CPC ...................................... *H02P 6/18* (2013.01)

(58) Field of Classification Search
CPC ........................................................ H02P 6/18
USPC .................................................... 318/400.03
See application file for complete search history.

(56) References Cited

U.S. PATENT DOCUMENTS 5,898,288 A    4/1999  Rice et al.
6,144,179 A    11/2000 Kessler et al.
7,474,068 B2   1/2009  Moller et al.
7,668,690 B2   2/2010  Schneider et al.
7,800,321 B2   9/2010  Knittel et al.

FOREIGN PATENT DOCUMENTS

| DE | 4017779 A1  | 12/1991 |
| DE | 4222914 A1  | 1/1994  |
| DE | 19511307 C1 | 1/1997  |
| DE | 4217265 C2  | 4/1998  |
| DE | 19729238 C1 | 8/1998  |
| EP | 0459435 A2  | 12/1991 |

OTHER PUBLICATIONS

"DC Motor 6 X Half Bridge With Sensorless Positioning," Data Sheet, E910.72, Elmos Semiconductor AG, Sep. 23, 2014, 33 pp.
Nottelmann, "Sensor-less Rotation Counting in Brush Commutated DC motors," IDEAdvance White Paper WP-02/10, 2011, 5 pp. (Applicant points out that, in accordance with MPEP 609.04(a), the 2011 year of publication is sufficiently earlier than the effective U.S. filing date and any foreign priority date of Feb. 3, 2016 so that the particular month of publication is not in issue.).

*Primary Examiner* — Erick Glass
(74) *Attorney, Agent, or Firm* — Slater Matsil, LLP

(57) ABSTRACT

A motor control circuit for controlling an electric motor may include at least one switching device configured to receive, from a pulse modulation device, a pulse modulated signal and output, based on the pulse modulated signal and to the electric motor, a current. In some examples, a frequency of the pulse modulated signal is below a threshold frequency. The motor control circuit may also include a transient detection circuit configured to detect a current transient, and responsive to detecting the current transient, output a pulse. The motor control circuit may further include a pulse counter configured to update, based on the pulse, a value indicative of a position of a rotor of the electric motor; and output the value indicative of the position of the rotor.

17 Claims, 7 Drawing Sheets

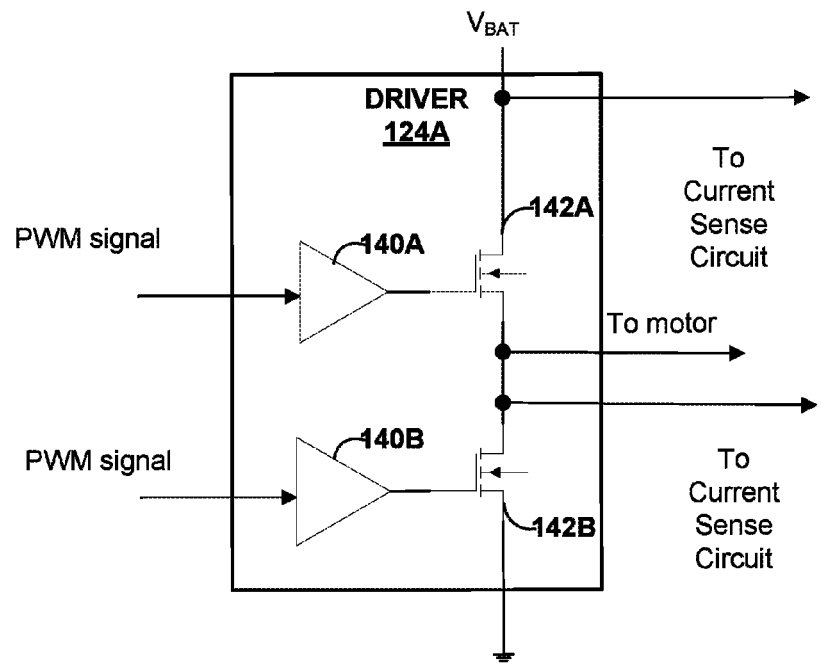
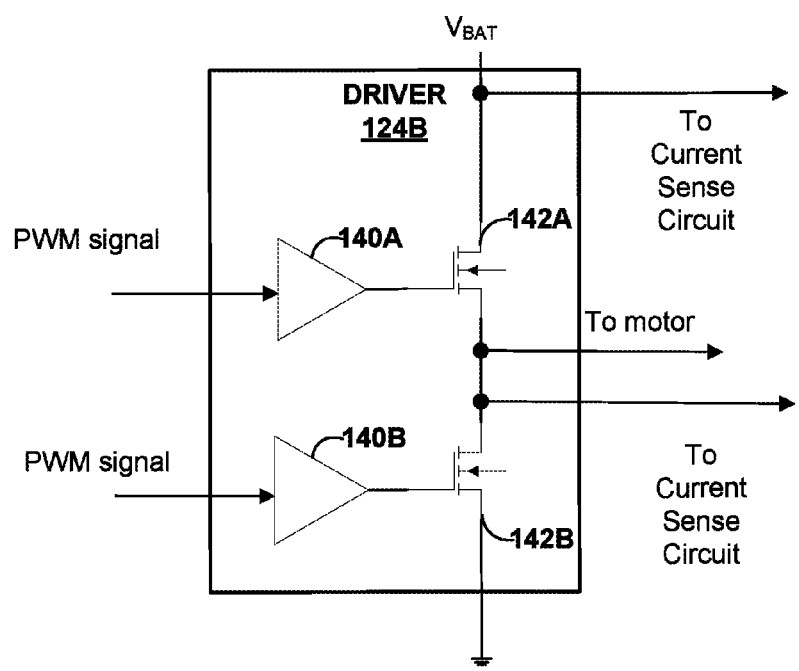
FIG. 3

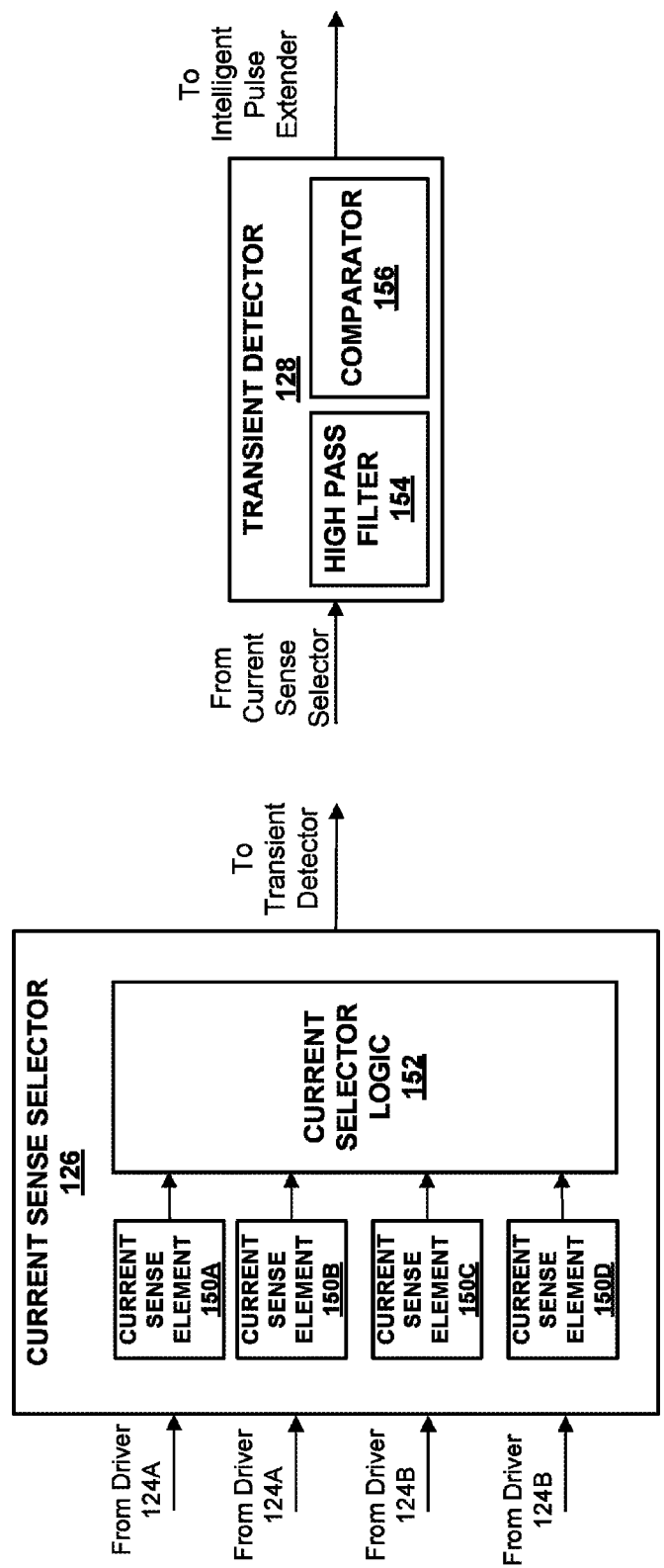

INTELLIGENT DETECTION UNIT (IDU) TO DETECT THE POSITION OF A ROTOR CONTROLLED BY PULSE MODULATION

TECHNICAL FIELD

This disclosure relates to electric motors, and in particular, to detecting the position of a rotor of an electric motor using current transient detection.

BACKGROUND

Operation of electric motors often requires a dedicated controller. The controller may need to determine the position of the rotor in order to control the electric motor. Some controllers may determine the position of the rotor without sensors. For example, a controller may determine the position of the rotor count using a technique known as ripple counting, which includes counting the number of ripples in the current caused by the back electromagnetic force (BEMF) and the commutation of the rotor. The controller may determine the position of the rotor based on the ripple count. In some examples, a controller may control the rotor using pulse-width modulation (PWM). If the frequency of the PWM signal is similar to the frequency of the ripples caused by the commutation, the controller may not be able to accurately count the number of ripples in the current.

SUMMARY

In general, this disclosure is directed to a motor control circuit for controlling an electric motor. The controller may include at least one switching device that is configured to receive, from a pulse modulation device, a pulse modulated signal, wherein a frequency of the pulse modulated signal is below a threshold frequency, and output, based on the pulse modulated signal and to the electric motor, a current. The motor control circuit may include a transient detection circuit configured to detect a current transient, and responsive to detecting the current transient, output a pulse. The motor control circuit may further include a pulse counter configured to update, based on the pulse, a value indicative of a position of a rotor of the electric motor, and output the value indicative of the position of the rotor.

In one example, a method includes receiving, by at least one switching device and from a pulse modulation device, a pulse modulated signal, wherein a frequency of the pulse modulated signal is below a threshold frequency. The method may include outputting, by the at least one switching device and based on the pulse modulated signal, a current to the electric motor. The method may also include detecting, by a transient detection circuit, a current transient and responsive to detecting the current transient, outputting, by the transient detection circuit, a pulse. The method may further include updating, by a pulse counter and based on the pulse, a value indicative of the position of a rotor of the electric motor, and outputting, by the pulse counter, the value indicative of the position of a rotor.

In another example, a system includes an electric motor and a motor control circuit. The motor control circuit may include at least one switching device configured to receive, from at least one pulse modulation device, a pulse modulated signal, wherein a frequency of the pulse modulated signal is below a threshold frequency, and output, based on the pulse modulated signal and to the electric motor, a current. The motor control circuit may also include a transient detection circuit configured to detect a current transient and responsive to detecting the current transient, output a pulse. The motor control circuit may further include a pulse counter configured to update, based on the pulse, a value indicative of a position of a rotor of the electric motor, and output the value indicative of the position of the rotor.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 3 is circuit diagram illustrating an example driver, in accordance with one or more in accordance with one or more aspects of this disclosure.

FIG. 4 is block diagram illustrating an example current sense selector, in accordance with one or more aspects of this disclosure.

FIG. 5 is block diagram illustrating an example transient detector, in accordance with one or more aspects of this disclosure.

DETAILED DESCRIPTION

In general, this disclosure is directed to techniques for controlling a machine that includes an electric motor. The machine includes a controller that controls the motor based at least in part on the position of a rotor of the motor. The machine also includes a motor control circuit that provides information indicative of the position of the rotor to the controller. For example, the motor control circuit includes a transient detection circuit to detect current transients caused by commutation of the rotor. In some examples, the motor control circuit outputs a pulse in response to detecting the current transients. The motor control circuit may include a pulse counter to count the number of pulses and output the value of the pulse counter to the controller. Because the number of expected pulses for each rotation of the rotor is known, the controller may determine the position of the rotor based on the number of pulses. In some examples, the motor control circuit may detect current transients caused by events other than the commutation of the rotor. The motor control circuit may include circuitry and logic to prevent the motor control circuit from outputting a pulse for all of the detected current transients, such that the value of the pulse counter may more accurately indicate the position of the rotor.

The disclosure describes techniques that may improve operation of the machine by enabling the motor control circuit to reduce or eliminate the number of incorrect pulses that may otherwise be output when a current transient is detected. By reducing or eliminating the number of incorrect pulses, the controller may more accurately determine the position of the rotor. As a result, the techniques described in this disclosure may improve control of the motor and lower the risk of damaging the motor.

Figure 1:
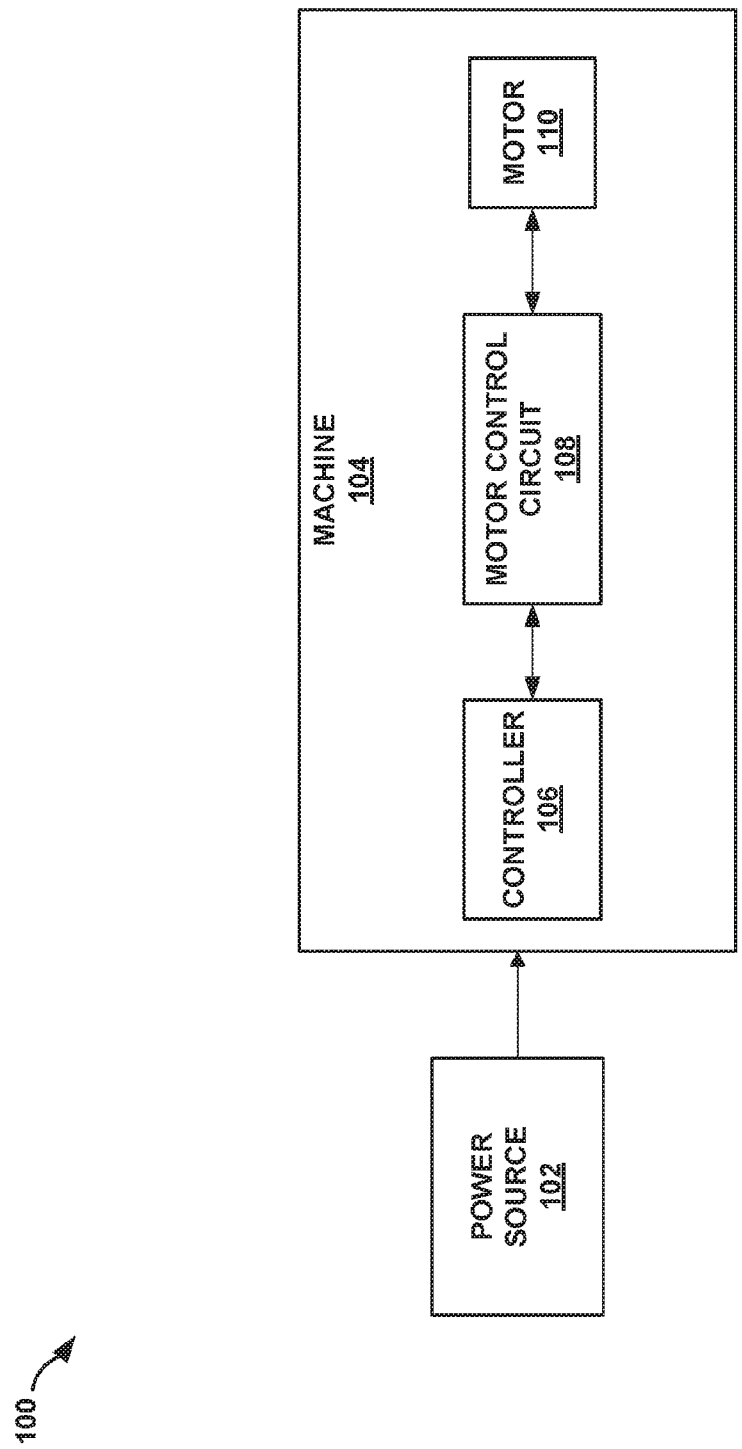
FIG. 1 is a block diagram illustrating an example system for controlling an electric motor, in accordance with one or more aspects of this disclosure.

FIG. 1 is a block diagram illustrating an example system 100 for controlling an electric motor, in accordance with one or more exemplary techniques of this disclosure. FIG. 1 shows system 100 as having separate and distinct components, shown as power source 102 and machine 104, however system 100 may include additional or fewer components. For instance, power source 102, controller 106, motor control circuit 108, and electric motor 110 may be four individual components or may represent a combination of one or more components that provide the functionality of system 100 as described herein.

In the example of FIG. 1, system 100 includes power source 102 which provides power to one or more components of system 100. Numerous examples of power source 102 exist and may include, but are not limited to, power grids, generators, transformers, batteries, solar panels, windmills, regenerative braking systems, hydro-electrical or wind-powered generators, or any other form of devices that are capable of providing electrical power to system 100.

In the example of FIG. 1, machine 104 includes controller 106, motor control circuit 108, and electric motor 110. In some examples, machine 104 includes a heating, ventilation, and air conditioning (HVAC) machine. In other examples, machine 104 includes a vehicle, such as a passenger vehicle, commercial vehicle, all-terrain vehicle, watercraft, aircraft, or any other type of vehicle. In examples where machine 104 includes a vehicle, motor 110 may drive a wheel, window, seat, or any other mechanical device that is part of the vehicle. However, machine 104 is not necessarily limited to any particular machine and the techniques of this disclosure may find application with any machine that includes an electric motor 110.

In some examples, motor 110 may include a brushed DC motor including a shaft, rotor, stator, permanent magnet, and a plurality of commutator segments. In some examples, motor 110 includes a sensorless electric motor. For example, a sensorless motor does not include sensors to monitor the stator currents, or the speed, direction, or position of the rotor.

Controller 106 controls operation of electric motor 110. In some examples, controller 106 may be configured to communicate with motor control circuit 108. For example, controller 106 may include one or more pulse modulation devices which may provide one or more pulse modulated signals to a plurality of switching devices within motor control circuit 108. The one or more pulse modulated signals may cause one or more of the plurality of switching devices to transition between an open-state and closed-state, which may control flow of current through motor 110. The one or more pulse modulation devices may operate according to pulse density modulation (PDM), pulse width modulation (PWM), pulse frequency modulation (PFM), or another suitable modulation technique. Examples of controller 106 may include, but are not limited to, one or more processors, including, one or more microprocessors, digital signal processors (DSPs), application specific integrated circuits (ASICs), field programmable gate arrays (FPGAs), or any other equivalent integrated or discrete logic circuitry, as well as any combinations of such components.

Machine 104 includes motor control circuit 108. Similar to controller 106, motor control circuit 108 may include one or more processors, including, one or more microprocessors, digital signal processors (DSPs), application specific integrated circuits (ASICs), field programmable gate arrays (FPGAs), or any other equivalent integrated or discrete logic circuitry, as well as any combinations of such components. In some examples, controller 106 and motor control circuit 108 may be discrete components. However, in other examples, controller 106 and motor control circuit 108 may be integrated as a single controller.

Motor control circuit 108 may receive one or more signals from controller 106. For example, motor control circuit 108 may receive one or more pulse modulated signals (e.g., PWM signals) and a signal indicative of the rotational direction of the rotor from controller 106. In some examples, motor control circuit 108 may include a plurality of switching devices (e.g., transistors). The one or more PWM signals may cause the plurality of switching devices to transition between an open-state and a closed-state to selectively control the flow of current through motor 110. In some examples, motor control circuit 108 may include four switching devices arranged in an H-bridge configuration, such that two switching devices are coupled to the positive terminal of motor 110 and the other two switching devices are coupled to the negative terminal of motor 110. The one or more PWM signals may cause one of the switches coupled to the positive terminal and one of the switches coupled to the negative terminal to close, thus allowing a DC current to flow through motor 110. The DC current flow may flow between the positive terminal and negative terminal of motor 110 causing the rotor to spin. As the rotor spins, one or more commutators may brush against the stator, which may cause a ripple and/or transient in the current.

In some examples, motor control circuit 108 may detect a ripple and/or transient current in the rotor, which may be used by controller 106 to determine the position of the rotor of motor 110. For example, motor control circuit 108 may count the number of ripples (also referred to as ripple counting), which may correspond to a position of the rotor. However, motor control circuit 108 may not be able to accurately count the number of ripples if the frequency of the PWM signal received from controller 106 is less than a threshold frequency. For instance, below the threshold frequency, the frequency of the PWM signal may be similar to the frequency of the ripple in the current such that motor control circuit 108 may not be able to distinguish whether a ripple in the current is caused by the back electromagnetic force (BEMF) and the commutation of the rotor or whether it is caused by the PWM signal. As a result, if the PWM signal is below a threshold frequency, motor control circuit 108 may not be able to accurately count the ripples such that controller 106 may not be able to accurately determine the position of the rotor.

In some examples, rather than counting the number of ripples, motor control circuit 108 may detect current transients in the current. A current transient may include a brief but relatively large change in the current. In some examples, motor 110 may generate a current transient when two commutators of the rotor are both in contact with the same brush of the stator, which may cause a short in motor 110 and a temporary surge in the motor current. The number of current transients caused by commutation of the rotor may be indicative of the position of the rotor. For instance, if the rotor includes three commutator segments, and the stator includes two magnets, each rotation of the rotor may be expected to cause six current transients. However, in some examples, motor control circuit 108 may detect current transients that are not caused by the commutation of the rotor. These current transients may also be referred to as parasitic current transients. As one example, the plurality of switching devices may generate a parasitic current transient each time the plurality of switching devices transition between the open-state and the closed-state by causing a capacitor coupled motor 110 to charge or discharge.

Motor control circuit 108 may detect the current transients and may output a pulse for at least some of the detected current transients. Motor control circuit 108 may include a pulse counter to count the number of pulses, which may be indicative of the position of the rotor. For instance, if the rotor includes three commutator segments, and the stator includes two magnets, each rotation of the rotor may cause six current transients which may cause motor control circuit 108 to output six pulses. The pulse counter may count the number of pulses and motor control circuit 108 may output the value of the counter to controller 106. Because the number of expected current transients (and thus the number of expected pulses) per rotation of the rotor is known, controller 106 may determine the position of the rotor based on the number of pulses. Responsive to determining the position of the rotor, controller 106 may control motor 110 (e.g., by changing the duty cycle of the PWM).

Motor control circuit may detect parasitic current transients that are not caused by the commutation of the rotor. A parasitic current transient may, if not accounted for, cause motor control circuit 108 to output extra pulses such that the number of pulses does not accurately reflect the position of the rotor. Thus, in some examples, motor control circuit 108 may include circuitry and logic to output a number of pulses that more accurately indicates the position of the rotor. For example, motor control circuit 108 may detect a first current transient (e.g., either a parasitic current transient or a current transient caused by commutation of the rotor). Responsive to detecting a first current transient, motor control circuit 108 may output a first pulse. Motor control circuit 108 may set a timer for a particular amount of time, which may be based on the expected amount of time between commutations, and may lock the pulse until the timer has expired. In other words, motor control circuit 108 may extend the duration of the pulse for the particular amount of time. The particular amount of time may represent a portion (e.g., 40%, 50%, 60%, or any other portion) of the expected amount of time between commutations (which may be based on motor parameters, such as the voltage from a power source, the speed of the rotor, or other motor parameters). For instance, motor control circuit 108 may set the timer for 50% of the expected amount of time between commutations. If a second current transient is detected before the expiration of the timer, this may indicate that the rotor was not moving fast enough to cause both current transients and that the either the first current transient or the second current transient is a parasitic current transient. Thus, motor control circuit 108 may refrain from outputting a second pulse while the pulse is locked. In this way, motor control circuit 108 may output the number of pulses that more accurately reflects the number of commutations of the rotor, which may be used to determine the position of the rotor.

In some instances, if the frequency of the PWM signal that causes the switching device to transition between the open-state and the closed-state is below a threshold frequency, motor control circuit 108 may not be able to distinguish between current transients caused by the plurality of switching devices and the current transient caused by the commutation of the rotor of motor 110. In some examples where machine 104 includes an HVAC, the threshold frequency of the PWM signal may be approximately 50 Hertz (Hz) (plus or minus several Hz), approximately 100 Hz (plus or minus several Hz), or any frequency between approximately 50 and approximately 100 Hz. For example, if the threshold frequency is 75 Hz and the frequency of the PWM signal is 60 Hz, motor control circuit 108 may not be able to distinguish between the current transients caused by the switching devices and the current transient caused by commutation of the rotor. In some examples, motor control circuit 108 may blank parasitic current transients caused by the transition of the switching device between the open-state and the closed-state. In other words, motor control circuit 108 may refrain from outputting a pulse during the time the switching device transitions between the open-state and the closed-state. For example, motor control circuit 108 may include logic to determine when, based on the received one or more PWM signals, the plurality of switching devices transition between an open-state and a closed-state. Motor control circuit 108 may generate an edge blanking signal and refrain from outputting a pulse while the plurality of switching device transition between the open-state and the closed-state. In this way, motor control circuit 108 may avoid counting additional pulses that may not be indicative of the position of the rotor.

Controller 106 may receive the value of the pulse counter and determine the position of the rotor based at least in part on the received value. Controller 106 may control the rotor based, at least in part, on the position of the rotor. For instance, controller 106 may adjust the duty cycle of the at least one PWM signal, which may cause the rotor to change speed and/or position.

The techniques described in this disclosure may enable a motor control circuit to count a number of pulses that more accurately indicate the position of the rotor. A controller may receive a more accurate value from the pulse counter and may more accurately determine the position of a rotor. By detecting a first current transient, outputting a pulse, and extending the pulse for a particular amount of time, motor control circuit 108 may refrain from outputting a second pulse if the rotor was not moving fast enough to generate a second current transient. On the other hand, when a PWM signal has a frequency below a threshold frequency, motor control circuit 108 may blank a parasitic current transient caused by the transition of the switching device, which may enable motor control circuit 108 to refrain from outputting a pulse while the switching device transitions between the open-state and closed-state. Thus, motor control circuit 108 may output and count a more accurate number of pulses such that controller 106 may more accurately determine the position of the rotor and control the rotor.

Figure 2:
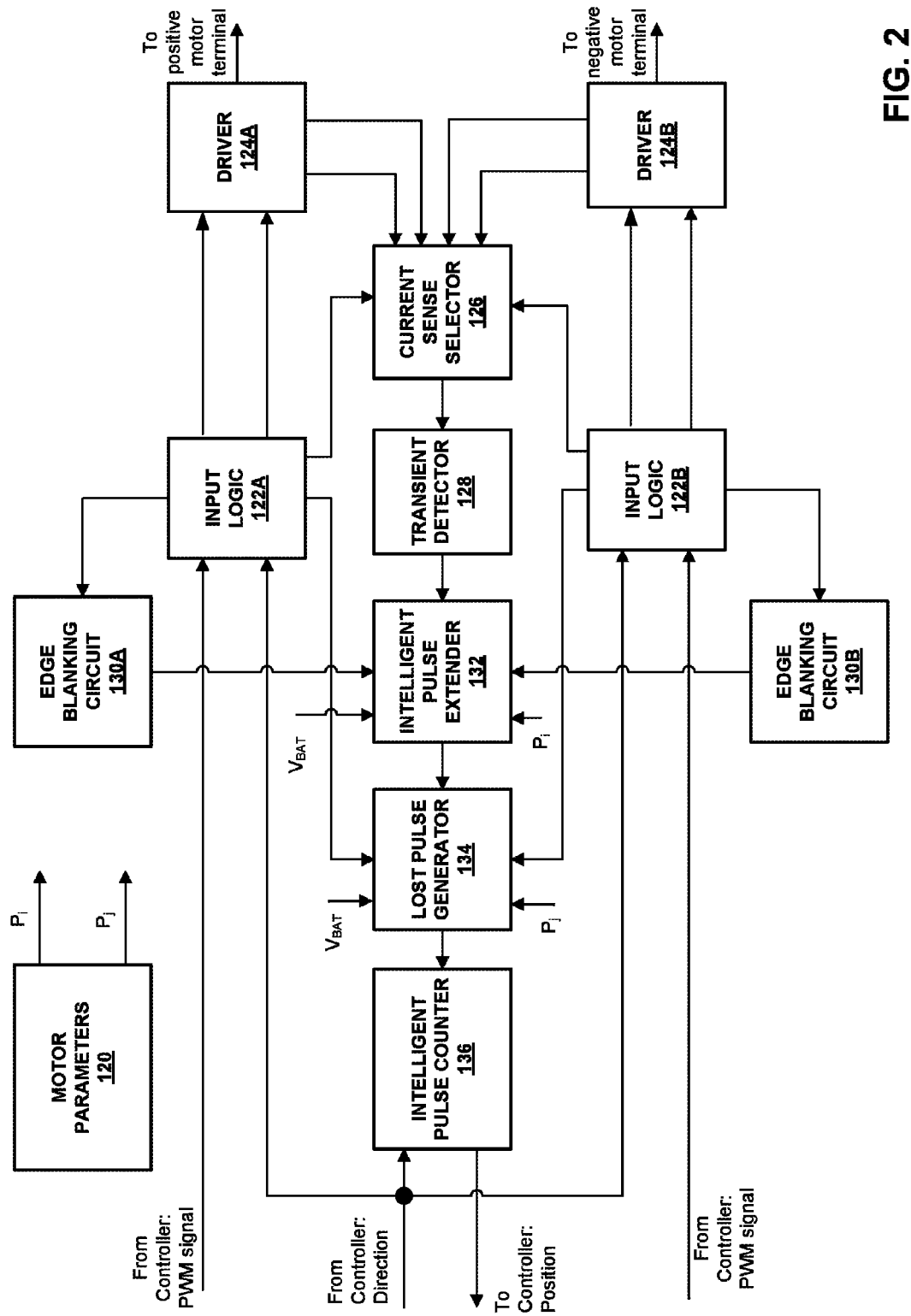
FIG. 2 is a block diagram illustrating an example motor control circuit, in accordance with one or more aspects of this disclosure.

FIG. 2 is a block diagram illustrating an example motor control circuit 108, in accordance with one or more techniques of this disclosure. As illustrated in FIG. 2, motor control circuit 108 of machine 104 may include motor parameters 120, input logic device 122A and 122B (collectively, input logic devices 122), drivers 124A and 124B (collectively, drivers 124), current sense selector 126, transient detector 128, edge blanking circuits 130A and 130B (collectively, edge blanking circuits 130), intelligent pulse extender 132, lost pulse generator 134, and intelligent pulse counter 136.

Motor parameters 120 may include information about motor 110. For example, motor parameters 120 may include the voltage of the power source (e.g., $V_{BAT}$), a motor constant, and/or other information indicative of the state of motor 110. Motor parameters 120 may output signals $P_i$ and $P_j$ indicative of the state of motor 110.

In some examples, input logic devices 122 may receive a plurality of input signals from controller 106 and may output one or more signals based on the received input signals. For example, input logic devices 122 may receive, from controller 106, one or more pulse modulated signals (e.g., PWM signals) and a signal that indicates the rotational direction of the rotor. Based on the input signals, each input logic device 122 may send a signal to a respective edge blanking circuit 122 to cause the respective edge blanking circuit 122 to generate an edge blanking signal, as will be described below. Similarly, in some examples, each input logic device 122 may send a signal to current sense selector 126 causing current sense selector to select and output a current to transient detector 128, as will be described in more detail below. In some examples, each input logic device 122 may send a signal to lost pulse generator 134. In some examples, each input logic device 122 may output the one or more PWM signals to a respective driver 124.

Drivers 124 may receive the one or more PWM signals (e.g., directly from controller 106 or via input logic devices 122). Each driver 124 may include a plurality of switching devices (e.g., MOS transistor based switches, gallium nitride (GaN) based switches, thyristors, insulated-gate bipolar transistors (IGBTs), and/or a combination of the same) to drive electric motor 110. The plurality of switching devices of drivers 124 may switch on and off based on the one or more PWM signals, which may provide a current to motor 110. One of the drivers 124 (e.g., driver 124A) may be coupled to the positive terminal of motor 110 while the other driver 124 (e.g., driver 124B) may be coupled to the negative terminal of motor 110. Thus, current may flow from driver 124A through motor 110 to driver 124B, or vice versa.

In some examples, current sense selector 126 may receive one or more candidate currents from each driver 124. For example, current sense selector may receive four candidate currents (e.g., two candidate currents from each driver 124). Current sense selector 126 may select one of the received candidate currents to send to transient detector 128. For instance, current sense selector 126 may receive a positive current and a negative current, and may select the positive current to send to transient detector 128. Responsive to selecting one of the one or more candidate currents, current sense selector 126 may output the selected current.

Transient detector 128 may receive the current output by current sense selector 126. Transient detector 128 may filter the received current to detect a current transient. For example, the current through motor 110 may include a DC component provided by a DC power source (e.g., a battery) and a transient component. In some examples, a current transient may be caused by the commutation of motor 110, by the switching of the switching devices, or other brief but relatively large change in the current. Transient detector 128 may filter out the DC component of the current to allow the transient component to pass through. In some examples, transient detector 128 may include a high pass filter to attenuate signals below a frequency of 10 kHz Transient detector 128 may compare the current transient to a reference current Responsive to determining the current transient is greater than the reference current, transient detector 128 may output a pulse.

In some examples, intelligent pulse extender 132 may receive the pulse from transient detector 128, an edge blanking signal from one or more of edge blanking circuits 130, an indication of motor parameters $P_i$, and an input voltage (e.g., $V_{BAT}$). In some examples, intelligent pulse extender 132 may be configured to alter a received pulse in order to output a number of pulses that more accurately represents the number of commutations of the rotor, and hence more accurately represents the position of the rotor.

Intelligent pulse extender 132 may alter the pulse by extending the duration of the received pulse for a particular amount of time. The particular amount of time may be based on the expected amount of time between a first commutation of the rotor and a second commutation of the rotor. In some examples, the expected amount of time between commutations may be based on the speed of the rotor, which may itself be based on the motor parameters $P_i$ such as motor current, voltage of the power source (e.g., $V_{BAT}$), and the load connected to the rotor. In other words, for a given rotor speed, the expected amount of time between commutations of the rotor may be known. Thus, if a second current transient is received too soon, it may indicate the second current transient is a parasitic current transient and is not generated by a second commutation of the rotor. By extending a pulse for a particular amount of time, intelligent pulse extender 132 may reduce the likelihood of outputting two pulses faster than the rotor will experience two commutations. Because the rotor speed may not be constant, the particular amount of time may be variable. In some examples, the particular amount of time may be a percentage of the expected amount of time between a first commutation of the rotor and a second commutation of the rotor, such as 50%, 60%, 70%, or another percentage of time. For instance, the particular amount of time may be set to a percentage that is large enough to reduce the probability of outputting a second pulse due to a parasitic transient that may be received before a second commutation of the rotor causes a second current transient. Likewise, the particular amount of time may be set to a percentage that is small enough to reduce the probability of extending the duration of the first pulse too long and skipping a second current transient caused by the commutation of the rotor.

Edge blanking circuits 130 may cause intelligent pulse extender 132 to refrain from outputting a pulse. Edge blanking circuits 130 may each receive a signal from a respective input logic device 122. For example, edge blanking circuit 130 may receive a signal indicating that the PWM signal will cause one or more of the switching devices to transition between an open-state and a closed-state. In some examples, the transition time (also referred to as switching time) may be indicated by the amount of time required for the edge of the PWM signal to transition between a high voltage (e.g., the closed-state) and a low voltage (e.g., the open-state). Because the transition time may be known, edge blanking circuit may start an edge blanking timer in response to receiving the signal from the respective input logic device 122. In some examples, upon starting the edge blanking timer, edge blanking circuit 122 may send a signal (also referred to as a pulse prevention signal) to intelligent pulse extender 132 to prevent intelligent pulse extender 132 from outputting a pulse. In this way, intelligent pulse extender 132 may refrain from outputting a pulse that might otherwise be output as a result of the switching devices transitioning between an open-state and a closed-state. In some examples, upon expiration of the edge blanking timer, edge blanking circuit 122 may send a signal (also referred to as a pulse reset signal) to intelligent pulse extender 132 enabling intelligent pulse extender 132 to output a pulse. As a result, intelligent pulse extender 132 may output pulses for current transients that are not caused by switching of the switching devices.

In some examples, edge blanking circuits 130 may be advantageous when the PWM signal operates at frequencies below a threshold frequency (e.g., 50, 60, 70, 80, 90, or 100 Hz, or any other frequency between approximately 50 and approximately 100 Hz). For example, the switching devices may transition between an open-state and closed-state, causing a motor capacitor to rapidly charge or discharge which may generate a current transient. When the frequency of the one or more PWM signals is less than a threshold frequency, the switching devices may transition between states relatively infrequently (e.g., every few milliseconds) compared to the switching time (e.g., a few microseconds). Thus, edge blanking circuit 130 may blank current transients relatively infrequently. However, in examples where the frequency of the one or more PWM signals is greater than the threshold frequency, edge blanking circuit 130 may blank current transients relatively frequently, which may increase the probability of blanking current transients that are caused by the commutation of the rotor.

In some examples, lost pulse generator 134 may receive the pulse output by intelligent pulse extender 132, a signal from input logic devices 122, an indication of motor parameters $P_j$, and an input voltage (e.g., $V_{BAT}$). Responsive to intelligent pulse extender 132 terminating the pulse, lost pulse generator 134 may set a pulse generation timer to a particular amount of time. In some examples, the particular amount of time of the pulse generation timer may be based on the expected amount of time between receiving a first pulse from intelligent pulse extender 132 and receiving a second pulse from intelligent pulse extender 132. The expected amount of time between pulses may be based on the expected amount of time between commutations of the rotor. If lost pulse generator 134 does not receive a second pulse within a particular amount of time, it may indicate that a current transient was too small to trigger the generation of a pulse. Thus, if the pulse generation timer expires without lost pulse generator 134 receiving a second pulse, lost pulse generator 134 may generate a second pulse. Responsive to terminating the pulse generated by lost pulse generator 134, lost pulse generator 134 may reset the pulse generation timer to the particular amount of time. Lost pulse generator 134 may output each pulse, whether received from intelligent pulse extender 132 or generated by lost pulse generator 134.

Intelligent pulse counter 134 may receive an indication of the rotor direction from controller 106 and a pulse from lost pulse generator 134. Intelligent pulse counter 134 may include a counter and the value of the counter may indicate the position of the rotor. For instance, if the rotor includes three commutator segments, and the stator includes two magnets, the position of the rotor may be indicated by a value between one and six. Intelligent pulse counter 134 may update the value of the counter in response to receiving a pulse. For example, if the rotor is rotating in a first (e.g., forward) direction when intelligent pulse counter receives a pulse, intelligent pulse counter 136 may increment the counter. In another example, if the rotor is rotating in a second (e.g., reverse) direction when intelligent pulse counter receives a pulse, intelligent pulse counter 136 may decrement the counter. In some examples, incrementing the counter includes increasing the value of the counter by one and decrementing the counter includes decreasing the value of the counter by one.

In some examples, the value of the pulse counter may be lost if motor control circuit 108 loses power. For instance, intelligent pulse counter 136 may store the value of the counter to a memory device such as volatile memory device (e.g., RAM). In some examples, after motor control circuit 108 regains power, intelligent pulse counter 136 may receive an indication of the rotor position from controller 104 and store a value indicating the position of the rotor in the counter. In some examples, intelligent pulse counter 136 may store the value of the counter in a non-volatile memory device (e.g., flash memory). Thus, intelligent pulse counter 136 may retain the value indicative of the position of the rotor even if motor control circuit 108 loses power.

Intelligent pulse counter 136 may output an indication of the value of the counter to controller 106. Because the number of pulses associated with a full rotation of the rotor is known, the value stored by intelligent pulse counter 134 may be indicative of the rotor position. As a result, controller 106 may determine the position of the rotor based on the value of the counter. Controller 106 may control motor 110 based on the position of the rotor. For example, controller 106 may update the PWM signal in order to speed up, slow down, or stop the rotor.

FIG. 3 is circuit diagram illustrating an example driver 114, in accordance with one or more in accordance with one or more aspects of this disclosure. Each driver 124 may include a half-bridge circuit with a high-side switching device 142A and a low-side switching device 142B (collectively, switching devices 142). Each driver 124 may include gate drivers 140A and 140B (collectively, gate drivers 140). In some examples, drivers 124A and 124B may collectively form a so-called H-bridge. In some examples, each driver 124 may output one or more candidate currents to current sense selector 126. For example, each driver 124 may output the current above high-side switch 142A as a first candidate current and the current between high-side switch 142A and low-side switch 142B as a second candidate current. Each driver 124 may also output a current to drive motor 110.

FIG. 4 is block diagram illustrating an example current sense selector 126, in accordance with one or more aspects of this disclosure. Current sense selector 126 may receive one or more candidate currents from drivers 114 and select one of the one or more candidate currents as the current to output to transient detector 128. Current sense selector 126 may include a respective current sensing element 150 for each of the received candidate currents. For example, as shown in FIG. 4, current sense selector 126 may include a plurality of current sense elements 150A-150D (collectively, current sense elements 150). Each current sense element 150 may sense a respective candidate current. For instance, current sense selector 150 may receive a first candidate current from above the high-side switch 142A of driver 124A which may be sensed by current sense element 150A, a second candidate current from between high-side switch 142A and low-side switch 142B of driver 124A which may be sensed by current sense element 150B, a third candidate current from above the high-side switch 142A of driver 124B which may be sensed by current sense element 150C, and a fourth candidate current from between high-side switch 142A and low-side switch 142B of driver 124B which may be sensed by current sense element 150D. In some examples, each current sense element 150 may include a shunt resistor. In some examples, each current sense element 150 may include a current sensing circuit. Current sense selector 126 may include current selector logic 152 which selects one of the plurality of sensed currents to output. For instance, a first current sense elements 150 may receive a positive current and a second current sense element 150 may receive a negative current. Current selector logic 152 may select the positive current to send to transient detector 128. Responsive to selecting one of the one or more candidate currents, current sense selector 126 may output the selected current.

FIG. 5 is block diagram illustrating an example transient detector, in accordance with one or more aspects of this disclosure. Transient detector 128 may receive the selected current from current sense selector 126 and may output a signal to intelligent pulse extender 132. Transient detector 126 may include a high-pass filter 154 and comparator 156. High-pass filter may filter the received current to detect a current transient. Comparator 156 may receive the current transient and compare the current transient to a reference current. Responsive to receiving a current transient that is greater than the reference current, transient detector 128 may output a signal to intelligent pulse extender 132.

Figure 6:
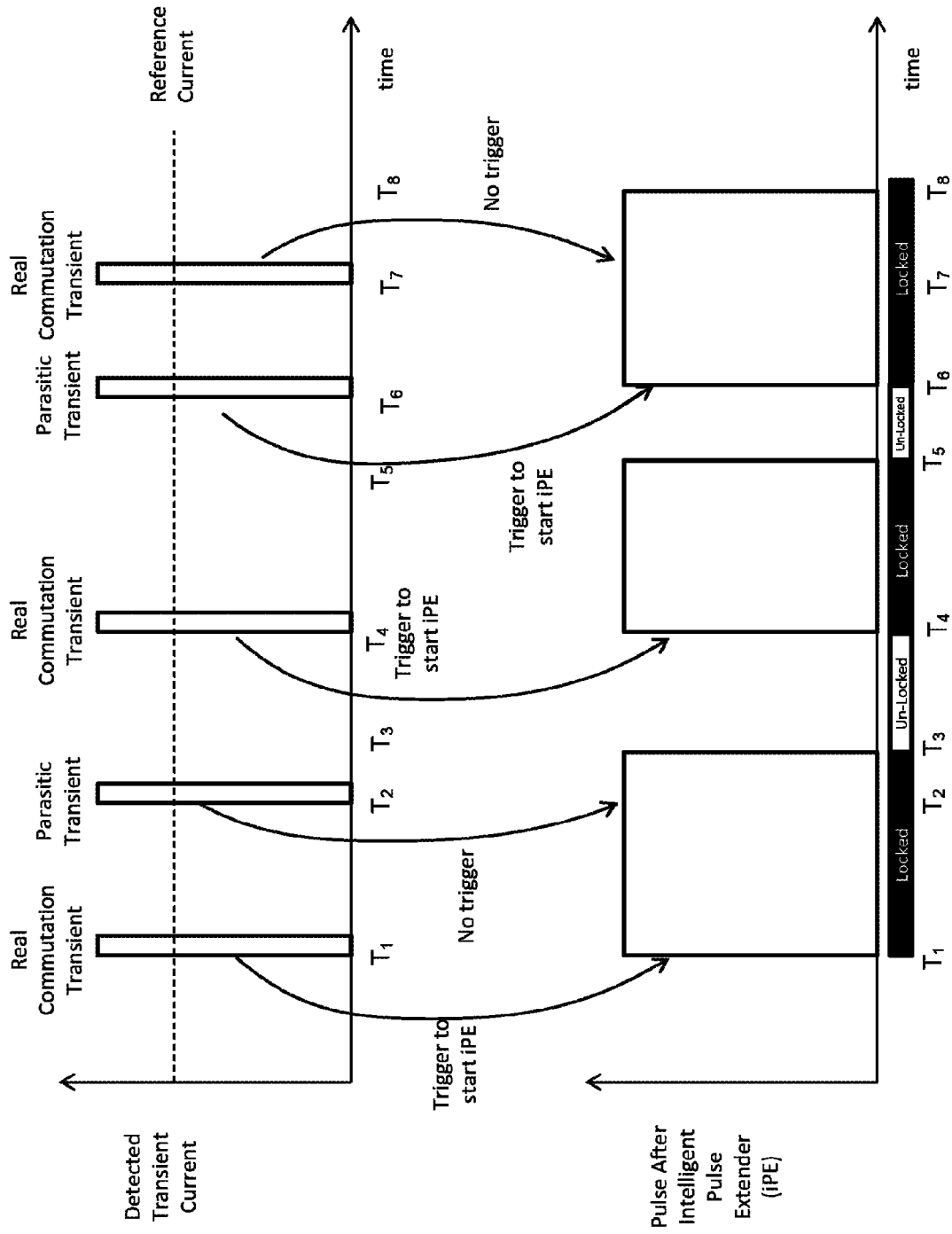
FIG. 6 is graph illustrating example operations of an intelligent pulse extender, in accordance with one or more aspects of this disclosure.

FIG. 6 is graph illustrating example operations of intelligent pulse extender 132, in accordance with one or more aspects of this disclosure. As described above, transient detector 128 may receive a current transient caused by the commutation of the rotor (also referred to as a real commutation transient) and may compare a detected current transient to a reference current. Responsive to determining the current transient is greater than the reference current, transient detector 128 may output a pulse. Intelligent pulse extender 132 may receive the pulse at time $T_1$ and may lock the pulse. In other words, intelligent pulse extender 132 may set a pulse extension timer for a particular amount of time and may extend the pulse for the duration of the pulse extension timer. Intelligent pulse extender 132 may set the pulse extension timer based on an expected amount of time between commutations of the rotor. At time $T_2$, transient detector 128 may detect a second current transient that was not caused by a commutation of the rotor (also referred to as a parasitic current transient). Transient detector 128 may determine the second current transient is above the threshold current and output a second pulse. Intelligent pulse extender 132 may receive the second pulse but may ignore the second pulse because the pulse extension timer has not expired. Thus, while the pulse extension timer is running, intelligent pulse extender 132 may output a single pulse to lost pulse generator 134 in order to prevent intelligent pulse counter 136 from over counting pulses. At time $T_3$, responsive to the pulse extension timer expiring, intelligent pulse extender 132 may terminate the extended pulse.

At time $T_4$, intelligent pulse extender 132 may receive a third pulse from transient detector 128. Because intelligent pulse extender 132 is not currently extending a previously received pulse, intelligent pulse extender 132 may set the pulse extension timer for a particular amount of time, extend the pulse for the duration of the pulse extension timer, and output the extended pulse to lost pulse generator 134. At time $T_5$, the pulse extension timer may expire and intelligent pulse extender 132 may terminate the third pulse.

At time $T_6$, transient detector 128 may detect a fourth current transient. As shown in FIG. 6, the current transient may be a parasitic transient. However, transient detector 128 may be unable to distinguish between parasitic current transients and current transients caused by the commutation of the rotor. Thus, transient detector 128 may output a pulse and output the pulse to intelligent pulse extender 132. Intelligent pulse extender may receive the pulse, set the pulse extension timer 132 for a particular amount of time, and extend the pulse for the duration of the pulse extension timer. At time $T_7$, transient detector may detect a fifth current transient and output a pulse. Intelligent pulse extender 132 may receive the pulse but may ignore the additional pulse because the fourth pulse is still locked. At the expiration of the pulse extension timer at time $T_8$, intelligent pulse extender may terminate the fourth pulse.

Intelligent pulse extender 132 may output the extended pulses but may refrain from outputting the pulses received while the extended pulses were locked. Thus, even though transient detector 128 may output five pulses, intelligent pulse extender 132 may extend the duration of three of those pulses, which may cause the remaining two pulses to not be counted. By extending the duration of some pulses, intelligent pulse extender 132 may ignore pulses that are received before the rotor is likely to have rotated enough to cause a second commutation. Thus, intelligent pulse extender 132 may output a number of pulses that more accurately reflects the position of the rotor.

Figure 7:
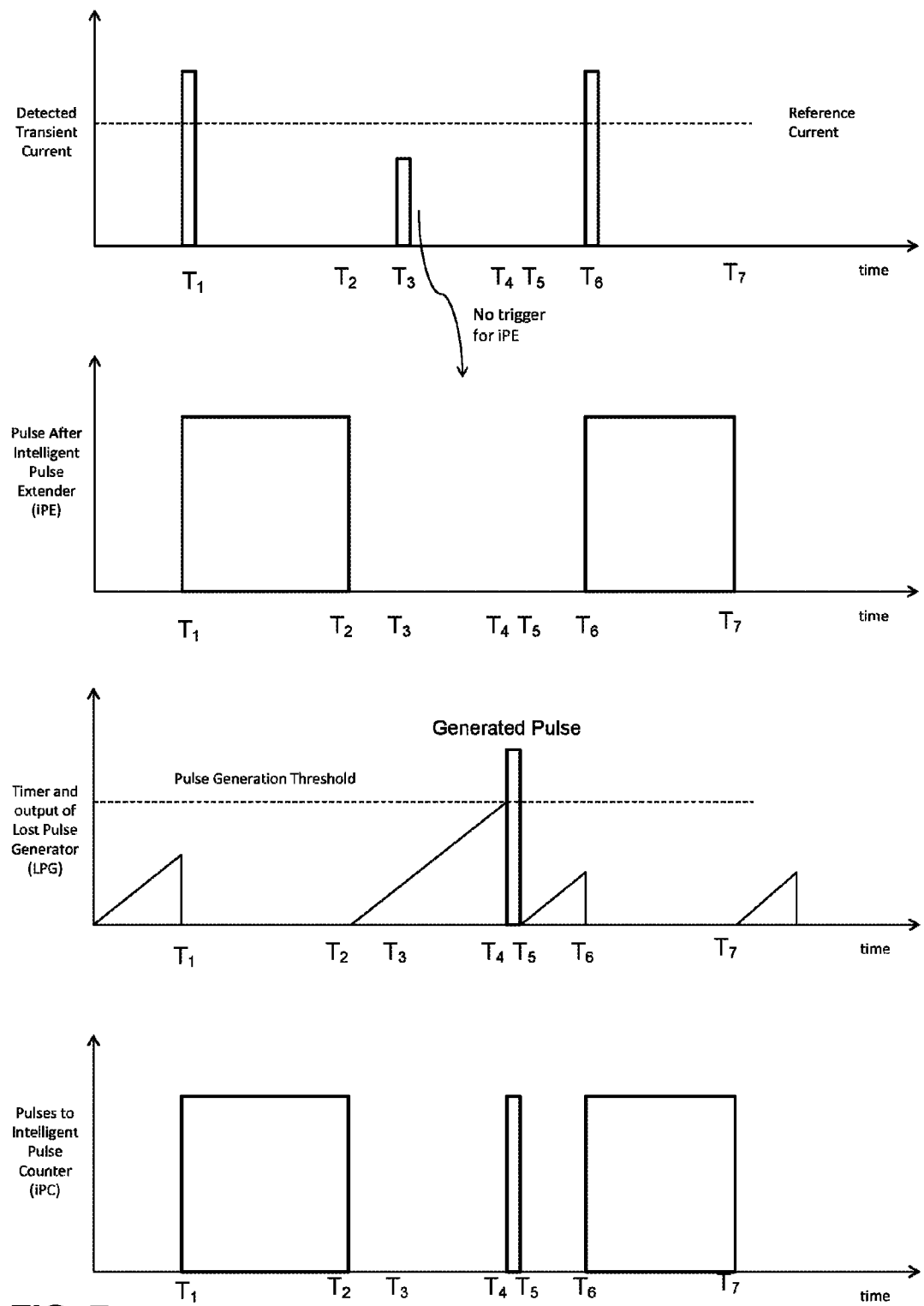
FIG. 7 is graph illustrating example operations of a lost pulse generator, in accordance with one or more aspects of this disclosure.

FIG. 7 is graph illustrating example operations of lost pulse generator 134, in accordance with one or more aspects of this disclosure. At time $T_1$, transient detector 128 may detect a current transient and compare the current transient to a reference current. If the current transient is greater than the reference current, transient detector 128 may output a pulse. Intelligent pulse extender 132 may extend the pulse for a particular amount of time. At time $T_2$, intelligent pulse extender 132 may terminate the pulse. Responsive to intelligent pulse extender 132 terminating the pulse, lost pulse generator 134 may set a pulse generation timer to a particular amount of time, which may be based on an expected amount of time between commutations of the rotor. If lost pulse generator 134 does not receive a second pulse before the pulse generation timer expires, this may indicate that a second commutation of the rotor did not generate a large enough current transient to cause transient detector 132 to output a second pulse.

Lost pulse generator 134 may configured to compensate for the small current transient by generating a pulse. For instance, at time $T_3$, transient detector 128 may detect a second current transient that is less than the reference current. As a result, transient detector 128 may refrain from outputting a second pulse at time $T_3$. At time $T_4$, the pulse generation timer may expire which may cause lost pulse generator 132 to generate a short, second pulse. At time $T_5$, lost pulse generator 134 may terminate the second pulse and reset the pulse generation timer to the particular amount of time. In some examples, at time $T_6$, transient detector 128 may detect a current transient larger than the reference current and may output a third pulse. Intelligent pulse extender 132 may extend the duration of the third pulse. At time $T_7$, intelligent pulse extender 132 may terminate the third pulse and lost pulse generator 134 may reset the pulse generation timer to the particular amount of time.

Figure 8:
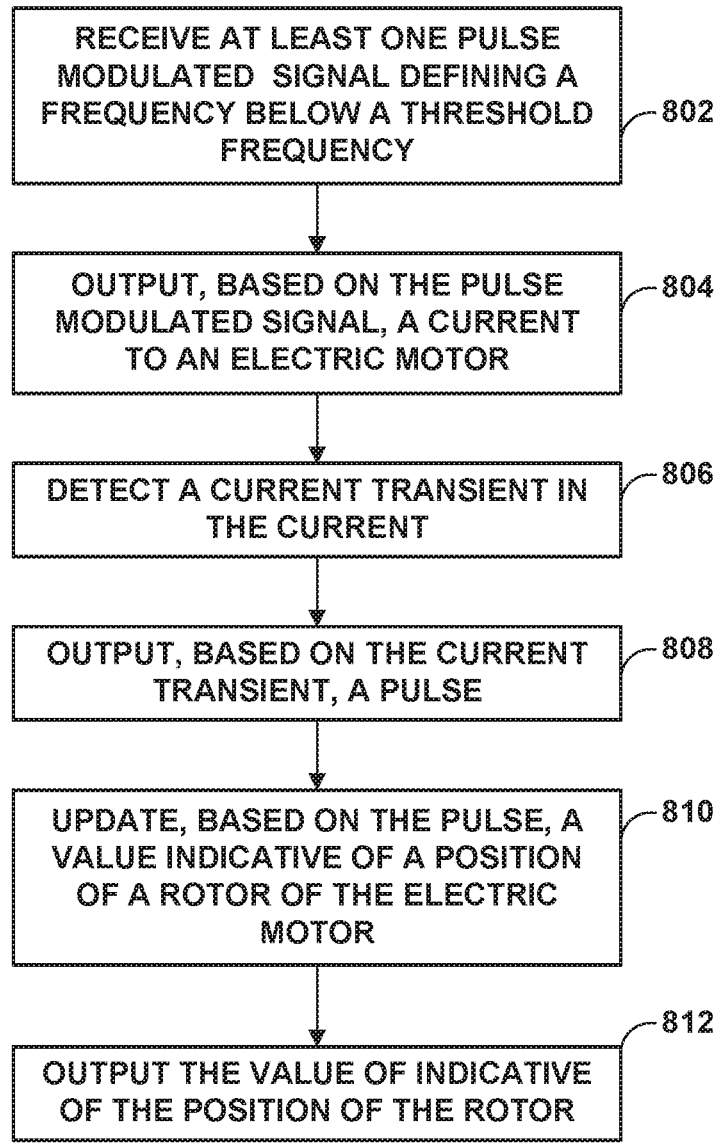
FIG. 8 is a flowchart illustrating an example method for controlling an electric motor, in accordance with one or more techniques of this disclosure.

FIG. 8 is a flowchart illustrating an example method for controlling an electric motor, in accordance with one or more techniques of this disclosure. For purposes of illustration only, the example operations are described below within the context of machine 104 as shown in FIGS. 1 and 2.

In some examples, drivers 114 may receive at least one pulse modulated signal defining a frequency below a threshold frequency (802). For example, the at least one pulse modulated signal may include a pulse width modulated (PWM) signal. Drivers 114 may output a current to an electric motor 110 based on the pulse modulated signal (804). For example, the PWM signal may cause one or more switching devices (e.g., transistors) of drivers 114 to close, which may cause current to flow through motor 110. Current sense selector 126 may receive one or more candidate currents from drivers 114 and may select one of the candidate currents to send to transient detector 128. In some examples, transient detector 128 may receive the selected current from current sense selector 126. Transient detector 128 may detect a current transient in the current (806). For instance, transient detector 128 may include a filter (e.g., a high pass filter) to filter the received current and detect the current transient. Transient detector 128 may output a pulse based on the current transient (808). For example, transient detector 128 may include a comparator to compare the current transient to a reference current and may output the pulse if the current transient is greater than the reference current.

Intelligent pulse extender 132 may receive the pulse and may set a pulse extension timer for a particular amount of time. The particular amount of time may be based on an expected amount of time between commutations of the rotor. Intelligent pulse extender 132 may extend the pulse for the duration of the pulse extension timer. At the expiration of the pulse extension timer, intelligent pulse extender 132 may terminate the pulse. Intelligent pulse extender 132 may output the extended pulse. In some examples, lost pulse generator 134 may receive extended pulse from intelligent pulse extender 132. Responsive to intelligent pulse extender 132 terminating the extended pulse, lost pulse generator 134 may set pulse generation timer for a particular amount of time. Responsive to the pulse generation timer expiring without receiving a second pulse, lost pulse generator 134 may generate a second pulse. Lost pulse generator 134 may output each pulse, whether received by intelligent pulse extender 132 or generated by lost pulse generator 134.

Intelligent pulse counter 136 may update a value indicative of the position of the rotor based on a received pulse (810). For example, pulse counter 136 may receive the pulse from lost pulse generator 134 and may increment or decrement the value indicative of the position of the rotor. Intelligent pulse counter 136 may increment the value indicative of the position of the rotor if the rotor is rotating in a first (e.g., forward) direction but may decrement the value indicative of the position of the rotor if the rotor is rotating in a second (e.g., reverse) direction. Intelligent pulse counter 136 may output the value indicative of the position of the rotor (812).

Controller 110 may receive the value indicative of the position of the rotor and may control the rotor based, at least in part, on the position of the rotor. For instance, controller 110 may adjust the duty cycle of the at least one PWM signal, which may cause the rotor to change speed and/or position.

The following numbered examples may illustrate one or more aspects of the disclosure:

EXAMPLE 1

A motor control circuit for controlling an electric motor, comprising: at least one switching device configured to: receive, from a pulse modulation device, a pulse modulated signal, wherein a frequency of the pulse modulated signal is below a threshold frequency; output, based on the pulse modulated signal and to the electric motor, a current; a transient detection circuit configured to: detect a current transient, responsive to detecting the current transient, output a pulse; and a pulse counter configured to: update, based on the pulse, a value indicative of a position of a rotor of the electric motor; and output the value indicative of the position of the rotor.

EXAMPLE 2

The motor control circuit of example 1, further comprising: a pulse extender circuit configured to: receive, from the transient detection circuit, the pulse; extend, based on a speed of the rotor, a duration of the pulse; and output the pulse for the extended duration.

EXAMPLE 3

The motor control circuit of any of examples 1-2, further comprising: an edge blanking circuit configured to: generate an edge blanking signal while the at least one switching device transitions between an open-state and a closed-state; and output the edge blanking signal, wherein the pulse extender circuit is further configured to: receive, from the edge blanking circuit, the edge blanking signal; and refrain, based on the edge blanking signal, from outputting a second pulse.

EXAMPLE 4

The motor control circuit of any of examples 1-3, wherein the pulse extender circuit is further configured to: receive, from the transient detection circuit and while outputting the pulse for the extended duration, a second pulse; and responsive to receiving the second pulse, refrain from outputting the second pulse.

EXAMPLE 5

The motor control circuit of any of examples 1-4, further comprising a lost pulse generator circuit configured to: receive the pulse; responsive to the pulse terminating, set, based on an expected amount of time between a first commutation of the rotor and a second commutation of the rotor, a timer to a particular amount of time; and responsive to the timer expiring without receiving a second pulse, generate a second pulse; and responsive to generating the second pulse, output the second pulse, wherein pulse counter is further configured to, responsive to receiving the second pulse, update the value indicative of the position of the rotor.

EXAMPLE 6

The motor control circuit of any of examples 1-5, wherein the pulse counter is further configured to receive an indication of a direction of the rotor, wherein the pulse counter is configured to update the value indicative of the position of the rotor by being configured to: increment the value indicative of the position of the rotor when the direction of the rotor includes a first direction; and decrement the value indicative of the position of the rotor when the direction of the rotor includes a second direction.

EXAMPLE 7

The motor control circuit of any of examples 1-6, further comprising a current sense selector configured to: receive at least one candidate current; and select a particular current from the at least one candidate current, wherein the particular current comprises the current transient.

EXAMPLE 8

A method for controlling an electric motor, the method comprising: receiving, by at least one switching device and from a pulse modulation device, a pulse modulated signal, wherein a frequency of the pulse modulated signal is below a threshold frequency; outputting, by the at least one switching device and based on the pulse modulated signal, a current to the electric motor; detecting, by a transient detection circuit, a current transient; responsive to detecting the current transient, outputting, by the transient detection circuit, a pulse; updating, by a pulse counter and based on the pulse, a value indicative of the position of a rotor of the electric motor; and outputting, by the pulse counter, the value indicative of the position of a rotor.

EXAMPLE 9

The method of example 8, further comprising: receiving, by a pulse extender circuit and from the transient detection circuit, the pulse; extending, by the pulse extender circuit and based on a speed of the rotor, a duration of the pulse; and outputting, by the pulse extender circuit, the pulse for the extended duration.

EXAMPLE 10

The method of any of examples 8-9, further comprising: generating, by an edge blanking circuit, an edge blanking signal while the at least one switching device transitions between an open-state and a closed-state; outputting, by the edge blanking circuit, the edge blanking signal; receiving, by the pulse extender circuit, the edge blanking signal; and refraining, by the pulse extender circuit and based on edge blanking signal, from outputting a second pulse.

EXAMPLE 11

The method of any of examples 8-10, further comprising: receiving, from the transient detection circuit, by the pulse extender circuit and while outputting the pulse for the extended duration, a second pulse; and responsive to receiving the second pulse, refraining, by the pulse extender circuit, from outputting the second pulse.

EXAMPLE 12

The method of any of examples 8-11, further comprising: receiving, by a lost pulse generator circuit, the pulse; responsive to the pulse terminating, setting, by the lost pulse generator circuit and based on an expected amount of time between a first commutation of the rotor and a second commutation of the rotor, a timer to a particular amount of time; and responsive to the timer expiring without receiving a second pulse, generating, by the motor control circuit, a second pulse; and responsive to receiving the second pulse, updating, by the pulse counter, the value indicative of the position of the rotor.

EXAMPLE 13

The method of any of examples 8-12, further comprising: receiving, by the pulse counter and from a controller, an indication of a direction of the rotor, wherein updating the value indicative of the position of the rotor comprises: incrementing the value indicative of the position of the rotor when the direction of the rotor includes a first direction; and decrementing the value of the pulse counter when the direction of the rotor includes a second direction.

EXAMPLE 14

The method of any of examples 8-13, further comprising: receiving, by a current sense selector, at least one candidate current; and selecting, by the current sense selector, a particular current from the at least one candidate currents, wherein the particular current comprises the current transient.

EXAMPLE 15

A system for controlling an electric motor comprising: a controller comprising at least one pulse modulation device; and a motor control circuit comprising: at least one switching device configured to: receive, from the at least one pulse modulation device, a pulse modulated signal, wherein a frequency of the pulse modulated signal is below a threshold frequency; output, based on the pulse modulated signal and to the electric motor, a current; a transient detection circuit configured to: detect a current transient; responsive to detecting the current transient, output a pulse; and a pulse counter configured to: update, based on the pulse, a value indicative of a position of a rotor of the electric motor; and output the value indicative of the position of the rotor.

EXAMPLE 16

The system of example 15, wherein the motor control circuit further comprises: a pulse extender circuit configured to: receive, from the transient detection circuit, the pulse; extend, based on a speed of the rotor, a duration of the pulse; and output the pulse for the extended duration.

EXAMPLE 17

The system of any of examples 15-16, wherein the motor control circuit further comprises: an edge blanking circuit configured to: generate an edge blanking signal while the at least one switching device transitions between an open-state and a closed-state; and output the edge blanking signal, wherein the pulse extender circuit is further configured to: receive, from the edge blanking circuit, the edge blanking signal; and refrain, based on the edge blanking signal, from outputting a second pulse.

EXAMPLE 18

The system of any of examples 15-17, wherein the pulse extender circuit is further configured to: receive, from the transient detection circuit and while outputting the pulse for the extended duration, a second pulse; and responsive to receiving the second pulse, refrain from outputting the second pulse.

EXAMPLE 19

The system of any of examples 15-18, wherein the motor control circuit further comprises a lost pulse generator circuit configured to: receive the pulse; responsive to the pulse terminating, set, based on an expected amount of time between a first commutation of the rotor and a second commutation of the rotor, a timer to a particular amount of time; and responsive to the timer expiring without receiving a second pulse, generate a second pulse; and responsive to generating the second pulse, output the second pulse, wherein pulse counter is further configured to, responsive to receiving the second pulse, update the value indicative of the position of the rotor.

EXAMPLE 20

The system of any of examples 15-19, wherein the pulse counter is further configured to receive an indication of a direction of the rotor, wherein the pulse counter is configured to update the value indicative of the position of the rotor by being configured to: increment the value indicative of the position of the rotor when the direction of the rotor includes a first direction; and decrement the value indicative of the position of the rotor when the direction of the rotor includes a second direction.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A motor control circuit for controlling an electric motor, comprising:
at least one switching device configured to:
receive, from a pulse modulation device, a pulse modulated signal, wherein a frequency of the pulse modulated signal is below a threshold frequency, and
output, based on the pulse modulated signal and to the electric motor, a current;
a transient detection circuit configured to:
detect a current transient, and
responsive to detecting the current transient, output a pulse; and
a pulse counter configured to:
update, based on the pulse, a value indicative of a position of a rotor of the electric motor, and
output the value indicative of the position of the rotor: and
a pulse extender circuit configured to:
receive, from the transient detection circuit, the pulse,
extend, based on a speed of the rotor, a duration of the pulse, and
output the pulse for the extended duration.

2. The motor control circuit of claim 1, further comprising:
an edge blanking circuit configured to:
generate an edge blanking signal while the at least one switching device transitions between an open-state and a closed-state, and
output the edge blanking signal,
wherein the pulse extender circuit is further configured to:
receive, from the edge blanking circuit, the edge blanking signal, and
refrain, based on the edge blanking signal, from outputting a second pulse.

3. The motor control circuit of claim 1, wherein the pulse extender circuit is further configured to:
receive, from the transient detection circuit and while outputting the pulse for the extended duration, a second pulse; and
responsive to receiving the second pulse, refrain from outputting the second pulse.

4. The motor control circuit of claim 1, further comprising a lost pulse generator circuit configured to:
receive the pulse;
responsive to the pulse terminating, set, based on an expected amount of time between a first commutation of the rotor and a second commutation of the rotor, a timer to a particular amount of time;
responsive to the timer expiring without receiving a second pulse, generate a second pulse; and
responsive to generating the second pulse, output the second pulse,
wherein the pulse counter is further configured to, responsive to receiving the second pulse, update the value indicative of the position of the rotor.

5. The motor control circuit of claim 1, wherein the pulse counter is further configured to receive an indication of a direction of the rotor, wherein the pulse counter is configured to update the value indicative of the position of the rotor by being configured to:
increment the value indicative of the position of the rotor when the direction of the rotor includes a first direction; and
decrement the value indicative of the position of the rotor when the direction of the rotor includes a second direction.

6. The motor control circuit of claim 1, further comprising a current sense selector configured to:
receive at least one candidate current; and
select a particular current from the at least one candidate current, wherein the particular current comprises the current transient.

7. A method for controlling an electric motor, the method comprising:
- receiving, by at least one switching device and from a pulse modulation device, a pulse modulated signal, wherein a frequency of the pulse modulated signal is below a threshold frequency;
- outputting, by the at least one switching device and based on the pulse modulated signal, a current to the electric motor;
- detecting, by a transient detection circuit, a current transient;
- responsive to detecting the current transient, outputting, by the transient detection circuit, a pulse;
- updating, by a pulse counter and based on the pulse, a value indicative of a position of a rotor of the electric motor;
- outputting, by the pulse counter, the value indicative of the position of a rotor;
- receiving, by a pulse extender circuit and from the transient detection circuit, the pulse;
- extending, by the pulse extender circuit and based on a speed of the rotor, a duration of the pulse; and
- outputting, by the pulse extender circuit, the pulse for the extended duration.

8. The method of claim 7, further comprising:
- generating, by an edge blanking circuit, an edge blanking signal while the at least one switching device transitions between an open-state and a closed-state;
- outputting, by the edge blanking circuit, the edge blanking signal;
- receiving, by the pulse extender circuit, the edge blanking signal; and
- refraining, by the pulse extender circuit and based on edge blanking signal, from outputting a second pulse.

9. The method of claim 7, further comprising:
- receiving, from the transient detection circuit, by the pulse extender circuit and while outputting the pulse for the extended duration, a second pulse; and
- responsive to receiving the second pulse, refraining, by the pulse extender circuit, from outputting the second pulse.

10. The method of claim 7, further comprising:
- receiving, by a lost pulse generator circuit, the pulse;
- responsive to the pulse terminating, setting, by the lost pulse generator circuit and based on an expected amount of time between a first commutation of the rotor and a second commutation of the rotor, a timer to a particular amount of time; and
- responsive to the timer expiring without receiving a second pulse, generating, by a motor control circuit, a second pulse; and
- responsive to receiving the second pulse, updating, by the pulse counter, the value indicative of the position of the rotor.

11. The method of claim 7, further comprising:
- receiving, by the pulse counter and from a controller, an indication of a direction of the rotor,
- wherein updating the value indicative of the position of the rotor comprises:
  - incrementing the value indicative of the position of the rotor when the direction of the rotor includes a first direction; and
  - decrementing the value of the pulse counter when the direction of the rotor includes a second direction.

12. The method of claim 7, further comprising:
- receiving, by a current sense selector, at least one candidate current; and
- selecting, by the current sense selector, a particular current from the at least one candidate currents, wherein the particular current comprises the current transient.

13. A system comprising:
- an electric motor; and
- a motor control circuit comprising:
  - at least one switching device configured to:
    - receive, from at least one pulse modulation device, a pulse modulated signal, wherein a frequency of the pulse modulated signal is below a threshold frequency, and
    - output, based on the pulse modulated signal and to the electric motor, a current,
  - a transient detection circuit configured to:
    - detect a current transient, and
    - responsive to detecting the current transient, output a pulse,
  - a pulse counter configured to:
    - update, based on the pulse, a value indicative of a position of a rotor of the electric motor, and
    - output the value indicative of the position of the rotor, and
  - a pulse extender circuit configured to:
    - receive, from the transient detection circuit, the pulse,
    - extend, based on a speed of the rotor, a duration of the pulse, and
    - output the pulse for the extended duration.

14. The system of claim 13, wherein the motor control circuit further comprises:
- an edge blanking circuit configured to:
  - generate an edge blanking signal while the at least one switching device transitions between an open-state and a closed-state, and
  - output the edge blanking signal,
- wherein the pulse extender circuit is further configured to:
  - receive, from the edge blanking circuit, the edge blanking signal, and
  - refrain, based on the edge blanking signal, from outputting a second pulse.

15. The system of claim 13, wherein the pulse extender circuit is further configured to:
- receive, from the transient detection circuit and while outputting the pulse for the extended duration, a second pulse; and
- responsive to receiving the second pulse, refrain from outputting the second pulse.

16. The system of claim 13, wherein the motor control circuit further comprises a lost pulse generator circuit configured to:
- receive the pulse;
- responsive to the pulse terminating, set, based on an expected amount of time between a first commutation of the rotor and a second commutation of the rotor, a timer to a particular amount of time; and
- responsive to the timer expiring without receiving a second pulse, generate a second pulse; and
- responsive to generating the second pulse, output the second pulse,
- wherein the pulse counter is further configured to, responsive to receiving the second pulse, update the value indicative of the position of the rotor.

17. The system of claim 13, further comprising a controller comprising the at least one pulse modulation device, wherein the pulse counter is further configured to receive an indication of a direction of the rotor, wherein the pulse counter is configured to update the value indicative of the position of the rotor by being configured to:
increment the value indicative of the position of the rotor when the direction of the rotor includes a first direction; and
decrement the value indicative of the position of the rotor when the direction of the rotor includes a second direction.

* * * * *